Figure 1:
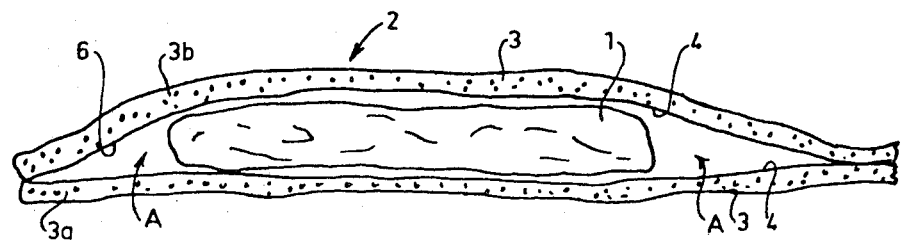

United States Patent [19]

Sorensen

[11] 4,382,970

[45] May 10, 1983

[54] FOOD PROCESSING

[75] Inventor: Torben Sorensen, Auckland, New Zealand

[73] Assignee: Getfresh Food Limited, Auckland, New Zealand

[21] Appl. No.: 142,159

[22] Filed: Apr. 21, 1980

[30] Foreign Application Priority Data

Feb. 26, 1980 [NZ] New Zealand .................... 192976

[51] Int. Cl.³ ............................................ A21D 13/00
[52] U.S. Cl. ..................................... 426/275; 426/502
[58] Field of Search ................ 426/275, 316, 312, 89, 426/138, 410, 502; 99/450.4, 450.5

[56] References Cited

U.S. PATENT DOCUMENTS

| 2,134,026 | 10/1938 | Brooks | 426/275 |
| 2,998,318 | 8/1961 | Forkner | 426/275 |
| 3,083,651 | 4/1963 | Cooper | 426/275 |
| 3,695,900 | 10/1972 | Young et al. | 426/129 |
| 3,740,237 | 6/1973 | Grindrod et al. | 426/410 |
| 3,782,966 | 1/1974 | Forkner | 426/275 |
| 3,895,475 | 7/1975 | Woltelsperger | 426/410 |

FOREIGN PATENT DOCUMENTS

| 45-11551 | 4/1970 | Japan | 426/275 |
| 474409 | 11/1937 | United Kingdom . | |

Primary Examiner—Hiram H. Bernstein
Attorney, Agent, or Firm—Holman & Stern

[57] ABSTRACT

This invention relates to food processing and in particular to a method and apparatus for processing food to form a foodstuff incorporating a filling encased in an edible sheet material. The method includes forming a sandwich of layers of edible flexible sheet material having a stabilized filling placed therebetween, placing the sandwich in an evacuating chamber, withdrawing gas in the chamber surrounding the sandwich and thereafter introducing gas into the chamber again to compress the layers of edible sheet material against one another about the filling. Apparatus of the invention provides a tray for receiving the sandwich and a forming member one or both being movable relative to the other to force portions of the flexible sheet material between the filling against one another prior to the introducing of gas into the evacuated chamber.

A method and apparatus for branding the foodstuff is also provided by the invention whereby a heated element is brought into contact with the foodstuff during formation to impart an imprint thereonto, the element being heated at least during contact with the foodstuff and until withdrawal to prevent the element sticking to the foodstuff.

21 Claims, 8 Drawing Figures

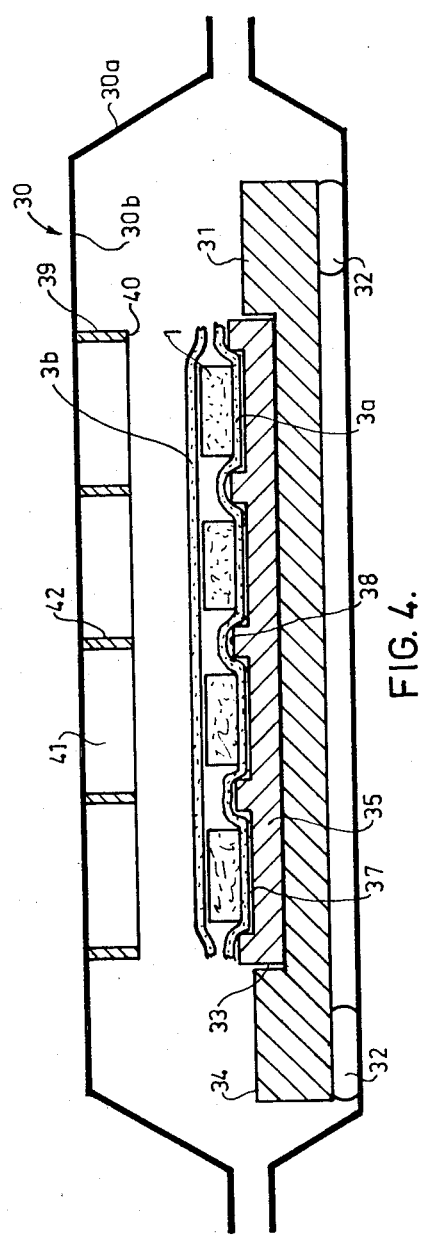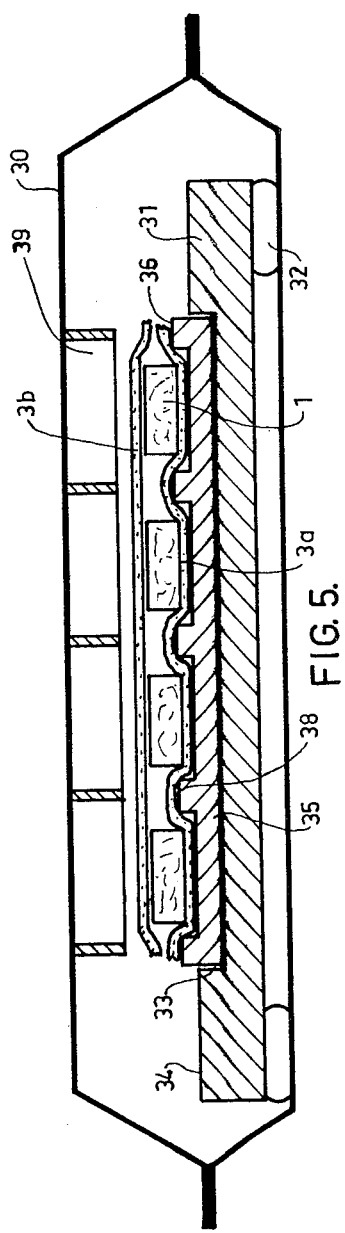

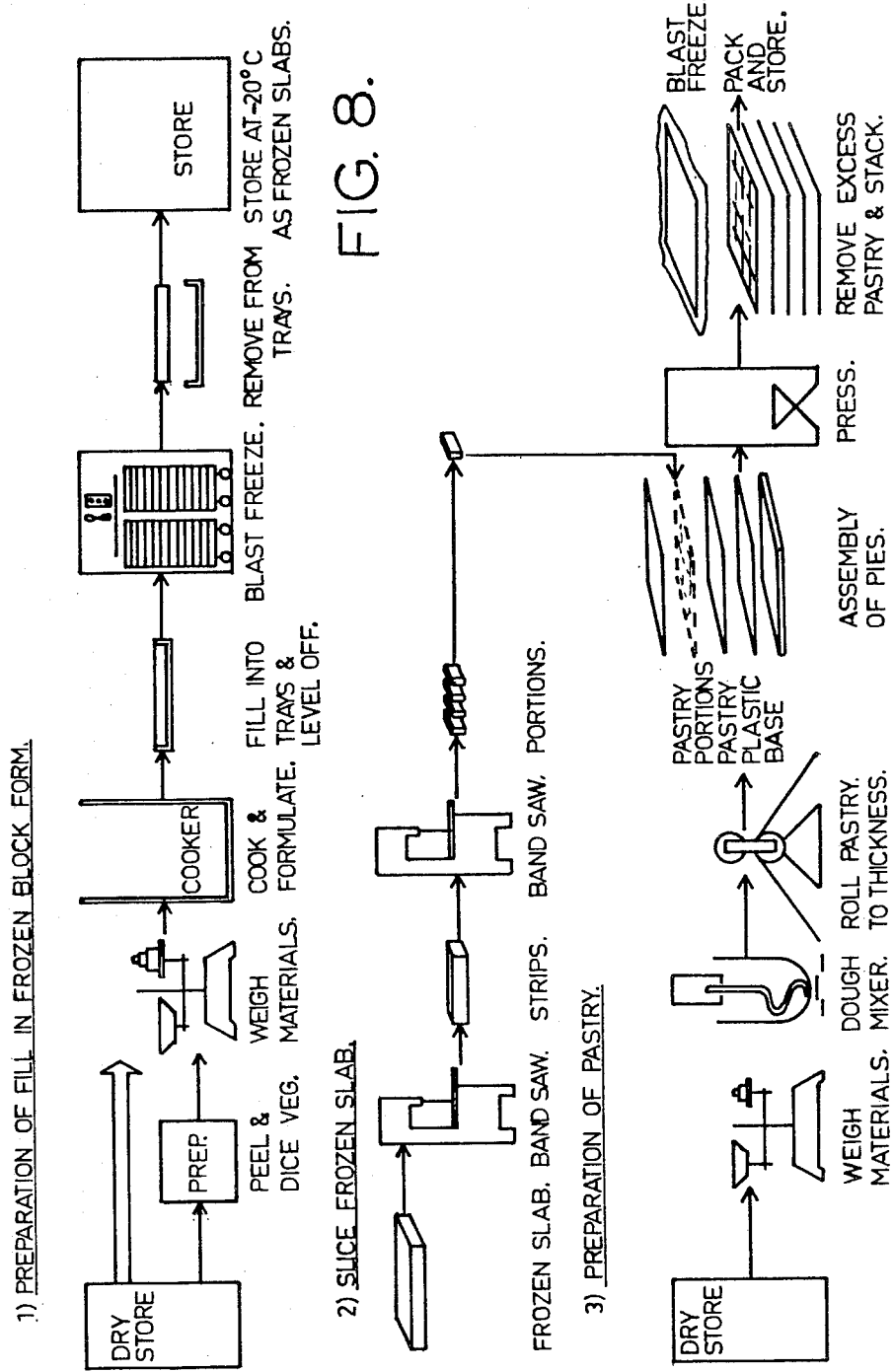

FOOD PROCESSING

This invention relates to food processing and in particular to a method of processing or manufacturing foodstuffs and to an apparatus for use in conjunction with said method.

In particular, the invention relates to the manufacturing of foodstuffs incorporating a filling encased in an edible sheet material, such as for example pastry and the like. Up until this time, methods of manufacturing foodstuffs on a production line basis have required either high manual labour input, or substantial investment in plant and machinery (such as for example, conveyors, moulds and the like), together with high volume production in order to achieve a required degree of efficiency during manufacture.

Thus, it will be appreciated that such methods of manufacture are reasonably complicated and expensive to set up and maintain, and furthermore require continuing supervision and or maintenance to ensure a high quality in so far as the product and hygiene standards are concerned.

Also up until this time, when forming foodstuffs, hot or liquid fillings have been used which have caused problems with the texture of pastry and which have also caused handling problems. It can be said therefore that methods of forming foodstuffs up until this time have brought about certain handling problems.

It is an object of this invention to go at least someway towards overcoming these problems.

Other objects of this invention will become apparent from the following description.

According to one aspect of this invention, there is provided a method of manufacturing foodstuffs, including the steps of:

1. Sandwiching a filling substance between layers of edible, flexible sheet material;
2. Evacuating gas from about said filling and sheet material;
3. Reintroducing gas about said filling and sheet material so that said gas compresses layers of sheet material together about said filling.

According to a further aspect of this invention, there is provided a method of manufacturing foodstuffs including the steps of:

1. Sandwiching a filling substance between layers of edible, flexible sheet material;
2. Evacuating gas from about said filling and sheet material;
3. Causing forming means to be positioned against said sheet material adjacent areas where said filling is sandwiched between layers of flexible sheet material, to thus seal said sheet material about areas of filling;
4. Reintroducing gas about said filling and sheet material such that said gas compresses the layers of flexible sheet material together to seal said layers about said filling.

According to a further aspect of this invention, there is provided apparatus for forming foodstuffs including a surface for supporting foodstuffs thereon; forming means being positioned adjacent to but spaced apart from said support surface; means being provided to move at least one of the forming means and support surface relative to the other.

This invention will now be described by way of example only, and with reference to the accompanying drawings, wherein:

FIG. 1: is a cross-sectional side elevation of a foodstuff being formed, up until the introduction of air.

Figure 2:
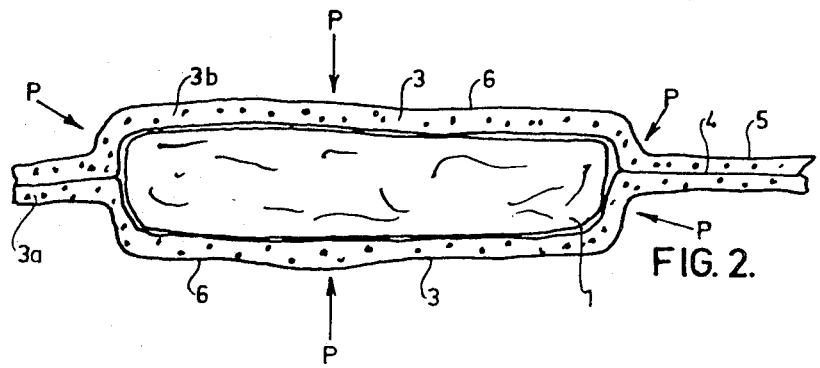

FIG. 2: is a cross-sectional side elevation of foodstuffs after the introduction of air.

Figure 3:
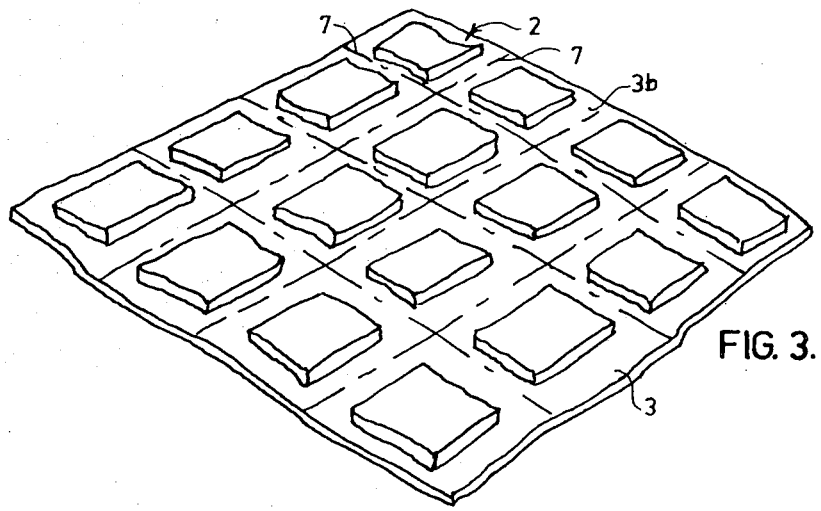

FIG. 3: is a diagrammatic perspective view of a method of forming a foodstuff.

FIG. 4: is a substantially diagrammatic cross-sectional side view of a first stage of the method according to the present invention, showing a foodstuff in the evacuating chamber, with the chamber open and pressurised.

FIG. 5: is a further view of the embodiment of FIG. 4 of the drawings showing the chamber closed and under evacuation.

Figure 6:
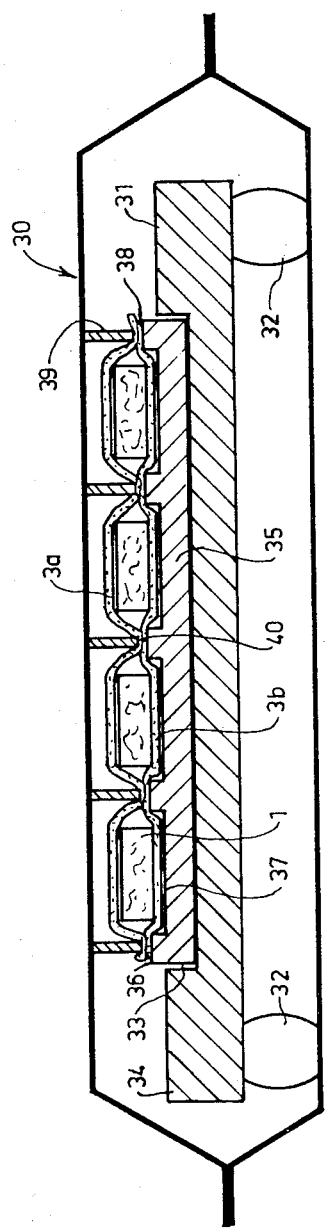

FIG. 6: is a further view of the invention of FIGS. 4 and 5 showing the chamber closed and evacuated, with forming means engaged.

Figure 7:
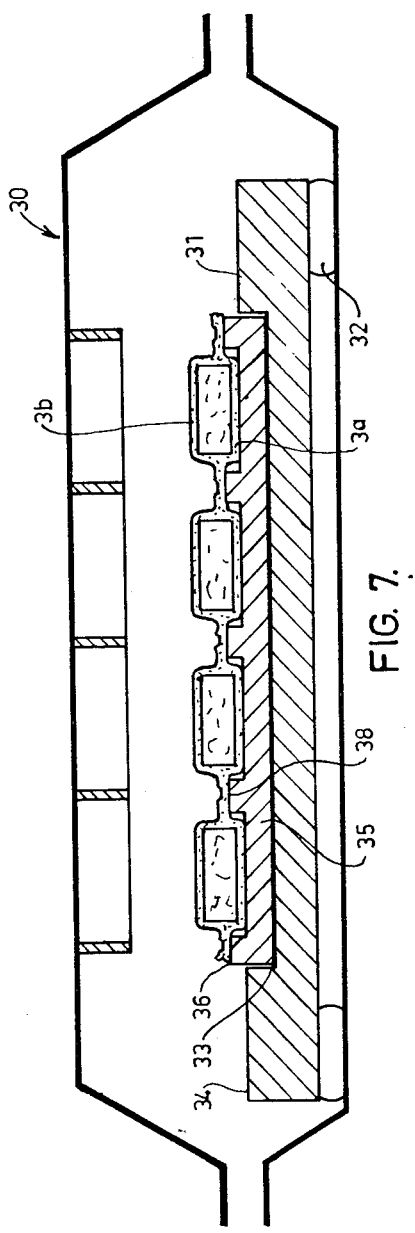

FIG. 7: is a further view of the invention in the final stage of the method as described, showing the chamber again open and pressurised.

FIG. 8: is a diagrammatic flow diagram covering the process of the present invention.

The present invention will be described by way of example only, with reference to the forming of foodstuffs in the form of fillings covered and encapsulated by pasty. Such foodstuffs are for example pies, sausage rolls, tarts and the like. It will be appreciated therefore that reference will be made throughout the specification and claims to sheet material and pastry.

Referring now to FIGS. 1, 2 and 3 of the accompanying drawings, foodstuff is formed by sandwiching a filling material 1 between layers of edible flexible sheet material such as pastry 3, opposing faces 4 of the pastry 3 preferably being sealed substantially about the periphery of the filling 1, to substantially encapsulate the filling 1.

In operation, and according to a preferred form of the invention, the lower layer of pastry 3a is formed of a desired thickness and consistency and is placed on a tray (not shown) covered by a suitable covering material such as for example a sheet of plastic material or paper, for hygiene and handling purposes.

The pastry 3a is of such a size that a plurality of sections may be provided arranged within the area of the pastry in a substantially "grid" system such as for example shown in FIG. 3 of the accompanying drawings.

A suitable filling material, is then placed onto the lower sheet of material.

In the preferred form of the invention, the filling material is stabilised, such as for example by being processed, frozen, jellied or the like. The filling is placed on the lower sheet of material 3a in a substantially spaced apart arrangement such as shown in FIG. 3 of the drawings. Preferably, the filling material is formed in blocks or preformed sections, which can be placed on the lower layer 3a in a substantially spaced apart grid formation.

It is preferred, (and will be described by way of example hereinafter) that the lower layer 3a of sheet material be placed on or over a tray or forming base which is provided with a plurality of indents or recesses, which are separated by raised areas. Thus, the sheet material will be placed over such a tray or forming surface and the filling substance or matter placed over the sheet material substantially in alignment with and to correspond with each indent or recess. This is described with reference to the invention using a tray including indents or recesses. Where a flat or planar tray is used, means can be provided to locate filling substance on the lower layer 3a of sheet material at spaced apart locations and positions, so as to permit the formation of spaced apart sections. For example an automatic filling placer with appropriate feed means or nozzles can be provided.

Continuing before the location of the filling 1 on the lower sheet 3a the pastry is preferably moistened by for example spraying or brushing, with water or some other suitable moistening fluid, especially in the area 5 between the areas of filling.

An upper sheet 3b is provided and in some cases, although it is not essential, the lower surface 4 of the upper sheet 3b can also be moistened.

The upper sheet 3b is positioned over the lower sheet 3a and the filling material 1 and the opposing surfaces are brought together so that the areas about the filling are generally brought together and moistened areas generally brought together. Each section therefore takes on the general appearance shown in FIG. 1 of the drawings.

The sandwich so formed, is then inserted into a suitable chamber, and a majority of the air is removed from the chamber. This results in air being drawn from not only about the exterior of the sandwich, (such as shown in FIG. 1 of the drawings) but also from spaces A between the opposing faces 4 of the sheets of material 3. After a predetermined degree of evacuation, gas or air is then introduced into the evacuation chamber so that the atmospheric pressure P impinges upon the outer faces 6 of the sheets 3.

The gas or air is preferably reintroduced rapidly into the evacuating chamber and the opposing faces of the sheets of pastry 3, being already adjacent and in some cases abutting each other, are caused to quickly seal against one another under the effects of atmospheric pressure being rapidly introduced into the chamber. The atmospheric pressure therefore crushes or forms the sheets 3 towards one another about the periphery of each filling, and thus the filling section and sections of stabilised foodstuffs, are encapsulated. The formed foodstuff can then be cooked or alternatively frozen for later use.

When a plurality of sections are formed by this method, the resulting sheet assumes a general appearance which is shown by way of example only in FIG. 3 of the drawings. The arrangement shown in FIG. 3 of the drawings indicates the resulting sections as being substantially square in formation. This is however by way of example only.

During the method, it is preferable that the air be evacuated from the chamber for a period of between 5 and 15 seconds, although it has been found that the preferred evacuation time is about 7 seconds. The atmosphere or air should be inserted or returned into the chamber as rapidly as possible. These times are however by way of example only. The times are advantageous and preferable in so far as certain chambers are concerned, but it should be appreciated that changes will occur in the times, depending upon the performance of various types of machinery (such as vacuum pumps and the like) and of course depending upon the size and area of chambers utilised.

Reference is now made to FIGS. 1, 2 and 3 of the drawings in conjunction with FIGS. 4,5,6 and 7 of the drawings.

The evacuating chamber is generally indicated by arrow 30, and is formed so as to have two sections, being an upper section and a lower section. These sections can be separate one from the other or alternatively can be hinged so as to enable easy opening and closing.

The evacuating chamber 30 is provided with or adapted to house or locate at least one movable tray 31 which is positioned therein, and which is adapted to receive a secondary tray 35 on which the suitable form of foodstuff is formed. The invention is described by way of example only, with only one tray being provided, however, it should be appreciated that the chamber can be formed or provided in order to house or locate a plurality of trays if desired.

The tray 31 is provided with a recess 33 in an upper surface 34 thereof, the recess 33 being adapted to receive the secondary tray 35. The secondary tray 35 has on its upper surface 36, a plurality of recesses or indentations 37 which are preferably arranged in a substantially "grid" or spaced apart formation so that the upper surface 36 of the secondary tray 35 provides a series of recesses or indentations 37 separated or surrounded by adjacent raised areas 38.

As shown by way of example in the accompanying drawings, and with particular reference to FIG. 4 of the drawings, the lower and upper sheets 3a and 3b are arranged upon the secondary tray 35 with the stabilised filling 1 sandwiched therebetween substantially as hereinbefore described.

The evacuating chamber is formed or provided with forming means 39, the forming means being provided or housed in the upper half of the chamber or in a position above, spaced apart from but adjacent to, the tray. The forming means 39 is preferably arranged as a substantially grid member, having a plurality of downwardly extending grid arms, which correspond substantially to the raised areas 38 between the recesses or indents in the tray.

Thus, the forming means 39 is arranged and has longitudinal rails 41 and substantially transverse rails 42 disposed substantially about and corresponding to the raised areas 38 of the tray 35.

The chamber is so constructed and the forming means so mounted or provided therewithin, that on the chamber closing and on the tray 36 being moved upwardly towards the forming means, or on the forming means being moved towards the tray, or on the forming means and tray being moved towards each other, the transverse rails and longitudinal rails of the grid of the forming means will move substantially against the raised areas of the tray and thus against the areas of pastry passing over the raised areas of the tray. This will then cause the adjacent areas of pastry (which will be about the periphery of the areas of filling) and which will already have been moistened, to be held together during the reintroduction of gas or atmosphere which will cause the adjacent areas of pastry to seal together about the periphery of each section of filling and thus encapsulate each section of filling.

The movable tray 31 which mounts the tray 36 is associated with suitable means to enable it to be raised and lowered relative to the forming means. This is by way of example only however, and it is envisaged that means can be provided to enable the forming means to move towards the tray, or alternatively means to be provided to permit the movement of both the tray and forming means relative to each other.

In the preferred form of the invention, with particular reference to FIGS. 5, 6 and 7 of the accompanying drawings, the movable tray is mounted on inflatable bladders 32, constructed of a suitable material.

The bladders 32 are provided with valves or valving means which open to the atmosphere. In addition, the bladders are connected by way of valving means, to a vacuum pump (not shown). The vacuum pump is also connected by way of valving means to the chamber. The chamber is connectable to the atmosphere by way of independent valving means. The various valves are time adjustable and are connected to and operate by means of switches.

Once the layers of flexible foodstuff and filling have been formed on the tray 36, the chamber is closed.

The chamber is divided into two sections and the upper section is hinged or moved away in some suitable manner from the lower section.

A vacuum pump (not shown) is provided and is connected by way of suitable valving to both the chamber and the bladders. The vacuum pump is actuated by suitable switching, independently of the chamber.

In use, the vacuum pump is actuated and the valve between the vacuum pump and the bladders will be normally open to thus connect the vacuum pump to the bladders. The bladders will therefore have vacuum applied thereto, and be in a deflated condition.

A suitable switching means is provided in association with the chamber and is connected to both the valving arrangement connecting the vacuum pump and the chamber and the vacuum pump and the bladders. On the chamber being closed, the switching arrangement opens the valving arrangement between the vacuum pump and the chamber and maintains the valve between the vacuum pump and the bladders in an open position. Thus, the bladders are maintained in a deflated condition.

By way of example, in one form of the invention, the air is evacuated from the chamber for a period of time ranging from between 5 and 15 seconds. This operates preferably to such an extent as to evacuate air from within the chamber to approximately the amount of 50% to 98%. The switch actuated by the closing of the chamber is a timing switch which is adjusted to run for a predetermined period of time. Once the period of time has expired, a second timing switch, (which is also adjusted to a predetermined time) is actuated which keeps the vacuum pump operating, and keeps the valve from the chamber to the vacuum pump open. However, the actuation of the second switch closes the valve between the vacuum pump and the bladders and opens a valve in the bladder connecting the bladder to the atmosphere. Thus, the difference between the vacuum and atmosphere causes the bladder to inflate very quickly, thus moving the tray upwardly within the chamber towards the forming means.

In a preferred form of the invention, the air or gas, is the atmosphere and passes into the bladders for a period of between 0.2 and 2 seconds.

As indicated hereinbefore, the downwardly extending longitudinal and transverse grids of the forming means will come into contact with the pastry and thus hold the sections together during the continued evacuation of air from within the chamber. As described the vacuum pump is operating and is connected to the chamber by way of the open valve, during this operation. Following the expiration of the period of time to which the second switch is set, the expiration of such time will cause the valve between the bladder and atmosphere to close, and the valve between the bladder and vacuum pump to open, at the same time opening the valve between the chamber and atmosphere closing the valve between the chamber and vacuum pump.

The connection between the bladder and vacuum pump and the rapid introduction of atmosphere into the chamber will cause the bladders to be deflated and to thus move the tray and foodstuffs away from the forming means. The rapid reintroduction of air or gas (atmosphere) into the chamber also causes the sections of pastry to be sealed together.

The upper section of the chamber is hinged to the lower section of the chamber in association with a suitable spring. As will be appreciated, while the vacuum is being applied within the chamber, the chamber will be caused to be maintained in a closed position. However, on the rapid reintroduction of air or gas into the chamber and following equilisation of the atmosphere both inside and outside of the chamber, the upper section may be caused to open or move away from the lower section.

The means for moving the tray and/or the forming means can be other than in the form of bladders. For example, mechanical lifting or moving means or rams (such as for example hydraulic or air operated rams) could be provided.

Following the rapid introduction of atmosphere into the chamber, the tray is removed and foodstuffs can be further frozen or cooked as desired.

In a form of the invention not shown in the accompanying drawings, the forming means can be provided with branding or marking means to permit the foodstuff to be branded during the encapsulation thereof. In this form of the invention, suitable heating wires can for example be provided in association with the forming means and can for example span between longitudinal and transverse grids.

In addition, or in the alternative, the grid can be provided with suitable connections to a source of electrical power and can also be provided with suitable connections or sockets, replaceable elements also being provided. Thus, in use, the elements can be plugged into the connections or sockets in the grid, in a substantially replaceable manner for the purpose of branding or marking the foodstuffs. This provides the advantage that different elements can be inserted for the purposes of marking or branding different foodstuffs and elements can be removed and replaced for the purposes of cleaning and repair. The heating means can be used in association with a suitable timing mechanism and suitable switches. It is important that the heating wires are only actuated for a short period of time. In addition, it is very important that when the pastry is in contact with the heating wires, the said heating wires be red hot or very hot, to avoid pastry sticking to the heating wires. As will be appreciated, it is important that the pastry not be touched with the heating wires for any great period of time, otherwise rather than a branding or marking appearing on the pastry, the pastry will burn.

In one form of the invention there is provided a suitable micro-switch which can be provided in association with the main tray 31. Thus, when the main tray 31 is being raised towards the forming means, it can activate the switch which will in turn actuate the heating wires for a predetermined period of time, so that when the foodstuff on the tray reaches the forming means, the wires will be red hot or sufficiently hot to avoid sticking, the timing being such that they will only be actuated for a period of time sufficient for the pastry or sheet material to be in touch with the heating wires to permit suitable branding and avoid sticking or burning. If desired, control means such as a switch and timing mechanism can be provided exteriorily of the housing to permit for the actuation of the heating means to thus brand or mark the foodstuffs.

It has been found the sequence for branding or marking should be ideally between 1.2 and 2.2 seconds, although it has been found preferable to have the branding sequence for a period of 1.6 seconds. This depends however on the type and length of heating wire concerned.

Reference is now made to FIG. 8 of the accompanying drawings. This is a flow diagram of the process of the invention. As will be appreciated, the food for the filling is taken from the dry store and is prepared and weighed and cooked to the desired formula. The foodstuff or filling is then placed into trays and is subjected to a blast freezer. Thus, the filling is then stabilised and in a form in which it can be utilised. The foodstuff is removed from the tray and stored in a freezer or frozen store, in substantially slab form, at a temperature of about minus 20° C. When it is desired to utilise the stabilised foodstuffs, the frozen slabs can be formed or sawn into strips by use of a band saw or similar cutting means, and then further cut by means of cutting means or band saw into portions.

The sheet material or pastry (in this form of the invention) is formed from the dry store and is weighed and is then subjected to dough mixing and rolled to the desired thickness.

As indicated in the flow diagram, the stabilised filling and sheet material are then subjected to the process substantially as hereinbefore described. They are then removed and if desired some of the pastry (such as from around the periphery) is removed. The prepared foodstuffs is then stacked and stored (such as in a freezer) or is cooked and then stored.

It will be appreciated that the invention has been described by way of example only and that modifications and improvements may be made to the invention without departing from the scope thereof, as defined by the appended claims.

I claim:

1. A method of manufacturing foodstuffs including the steps of:
   (1) Sandwiching one or more pieces of a stabilized filling substance between layers of edible, flexible, doughy sheet material;
   (2) Evacuating about 50% to 98% of the atmospheric gas from about said filling substance and said layers of sheet material;
   (3) Reintroducing rapidly a gas about said filling substance and said layers of sheet material so that said gas quickly compresses the layers of sheet material towards each other and about said filling substance, thereby forming a sealed, encapsulated foodstuff.

2. The method of claim 1 including the steps of placing said filling substance on a lower layer of sheet material; and placing an upper sheet of material over said lower layer and the filling substance thereon.

3. The method of claim 2 including the steps of positioning said layers of said sheet material about a plurality of said pieces of filling substance so as to define a plurality of articles or areas.

4. The method of claim 1 or 2 or 3 including the steps of moistening or dampening at least some parts of said layers of sheet material which are intended to be joined to each other, prior to said filling substance being sandwiched between said layers of sheet material.

5. The method of claim 4 including the steps of moistening or dampening at least some parts of the lower sheet of material.

6. The method of claim 5 using at least one tray having a plurality of spaced apart recesses or indents separated by raised portions; said method further including the steps of: placing a lower layer of sheet material on said tray; placing said filling substance on said lower layer of sheet material in positions corresponding substantially to the recesses or indents in the tray; placing an upper layer of sheet material over the lower layer and filling substance thereon, such that the filling substance is sandwiched between layers of sheet material; and applying means to the tray such that areas of the sheet material adjacent the raised portions of the tray are brought together so as to substantially encapsulate the filling and sandwich the filling between said layers of sheet material.

7. A method of manufacturing foodstuffs including the steps of:
   1. Sandwiching a stabilized filling substance between layers edible, flexible, doughy sheet material;
   2. Evacuating about 50% to 98% of the atmospheric gas from about said filling and sheet material;
   3. Causing forming means to be positioned against said sheet material about areas where said filling substance is sandwiched between layers of flexible sheet material, to thus seal said sheet material about said areas of filling substance;
   4. Reintroducing rapidly a gas about said filling substance and said layers such that said gas quickly compresses the layers of flexible sheet material together to seal said layers about said filling and form an encapsulated foodstuff.

8. The method of claim 1 or 7 wherein the method is carried out within an openable and closable evacuating chamber, the said steps of evacuating and reintroducing gas being effected with the chamber closed.

9. The method of claim 8 using a tray mounted and forming means provided within the chamber; which includes the step following the evacuation of gas of actuating means to bring the tray and forming means together so as to seal the layers of sheet material together about areas of filling substance.

10. The method of claim 9 using said tray mounted on a tray support which is movable relative to the forming means by the inflation and deflation of bladders; said method including the steps of inflating and deflating said bladders to move said tray.

11. The method of claim 1 or 7 including the step of evacuating said gas for a period of between 5 and 15 seconds.

12. The method of claim 11 wherein the gas is evacuated for seven seconds.

13. The method of claim 9 using heating means in association with the forming means; including the step of actuating said heating means for a predetermined period of time to thus apply heat to an upper surface of said sheet material to thus mark or brand said sheet material.

14. The method of claim 13 wherein the heat is applied for a period of between 1.2 and 2.2. seconds.

15. The method of claim 14 wherein the heat is applied for 1.6 seconds.

16. The method of claim 1 or 7 wherein the filling substance is a dimensionally stabilised filling substance.

17. The method of claim 16 wherein the filling substance is a prefrozen filling.

18. The method of claim 1 or 7 wherein the sheet material is pastry.

19. The method of claim 1 or 7 wherein the filling substance is a dimensionally stabilised prefrozen filling and the edible, flexible sheet material is a pastry dough.

20. The method of claim 19 wherein the foodstuffs are then frozen for storage.

21. The method of claim 19 wherein the foodstuffs are then cooked.

* * * * *